US009585145B2

(12) United States Patent
Ranta-Aho et al.

(10) Patent No.: US 9,585,145 B2
(45) Date of Patent: Feb. 28, 2017

(54) METHOD AND APPARATUS FOR DETERMINING THE TRANSMISSION TIME INTERVAL LENGTH

(71) Applicant: Nokia Solutions and Networks Oy, Espoo (FI)

(72) Inventors: Karri Markus Ranta-Aho, Espoo (FI); Alexander Sayenko, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 55 days.

(21) Appl. No.: 14/374,583

(22) PCT Filed: Jan. 24, 2013

(86) PCT No.: PCT/EP2013/051292
§ 371 (c)(1),
(2) Date: Jul. 25, 2014

(87) PCT Pub. No.: WO2013/110683
PCT Pub. Date: Aug. 1, 2013

(65) Prior Publication Data
US 2015/0016431 A1 Jan. 15, 2015

(30) Foreign Application Priority Data

Jan. 26, 2012 (WO) ................ PCT/EP2012/051205

(51) Int. Cl.
*H04W 72/04* (2009.01)
*H04W 74/08* (2009.01)
*H04L 5/00* (2006.01)

(52) U.S. Cl.
CPC ... *H04W 72/0446* (2013.01); *H04W 72/0406* (2013.01); *H04L 5/0044* (2013.01); *H04L 5/0053* (2013.01)

(58) Field of Classification Search
CPC ............ H04W 72/02; H04W 72/0446; H04W 74/0833
See application file for complete search history.

(56) References Cited

U.S. PATENT DOCUMENTS 8,432,864 B1 * 4/2013 Martin ............. H04W 72/0406
370/329
2010/0220623 A1 * 9/2010 Cave .................... H04L 1/0007
370/252

(Continued)

FOREIGN PATENT DOCUMENTS

| WO | WO 2010/030930 A1 | 3/2010 |
| WO | WO 2012/138756 A1 | 10/2012 |
| WO | WO 2013/023055 A1 | 2/2013 |

OTHER PUBLICATIONS

3GPP TS 25.211 V8.7.0 (Sep. 2010); 3rd Generation Partnership Project; Technical Specification Group Radio Access Network; Physical channels and mapping of transport channels onto physical channels (FDD) (Release 8), 58 pgs.

(Continued)

*Primary Examiner* — Scott M Sciacca
(74) *Attorney, Agent, or Firm* — Harrington & Smith

(57) ABSTRACT

A method includes receiving information on a requested transmission time interval length for use by a user equipment, determining if said requested transmission time interval length can be used, and if not causing a different transmission time interval length to be used by said user equipment.

9 Claims, 5 Drawing Sheets

(56) References Cited

U.S. PATENT DOCUMENTS

| | | | | |
|---|---|---|---|---|
| 2011/0019655 A1* | 1/2011 | Hakola | ............... | H04W 74/004 370/342 |
| 2012/0250644 A1* | 10/2012 | Sambhwani | ...... | H04W 72/0413 370/329 |
| 2013/0084877 A1* | 4/2013 | Martin | .................. | H04W 72/02 455/452.1 |
| 2013/0208668 A1* | 8/2013 | Ramos | .............. | H04W 74/0833 370/329 |
| 2015/0341925 A1* | 11/2015 | Pani | .................. | H04W 72/0413 455/450 |

OTHER PUBLICATIONS

3GPP TSG RAN WG2 Meeting #74, Barcelona, ES, May 9-13, 2011, R2-112854, "Supporting concurrent deployment of 2rms and 10ms TTI in a cell in CELL-FACH", Qualcomm Inc., 2 pgs.

3GPP TSG RAN WG2 Meeting #75bis, Zhuhai, China, Oct. 10-14, 2011, R2-115097, "On the common E-DCH resource in 2/10ms TTI concurrent operation", Alcatel-Lucent, Alcatel-Lucent Shanghai Bell, 3 pgs.

3GPP TSG RAN WG2 Meeting #75-BIS, Zhuhai, CN, Oct. 10-14, 2011, R2-114932, "On concurrent deployment of 2ms and 10 ms TTI in a cell in CELL_FACH", Qualcomm Inc., 17 pgs.

3GPP TSG-RAN WG2 Meeting #76, San Francisco, USA, Nov. 14-18, 2011, R2-116076, "Initial TTI selection for 2ms/10ms concurrent deployment in CELL_FACH", 6 pgs.

3GPP TSG-RAN WG2 #76, San Francisco, USA, Nov. 14-18, 2011, R2-116195, "Support concurrent deployment of 2ms and 10ms TTI", Ericsson, ST-Ericsson, 4 pgs.

* cited by examiner

METHOD AND APPARATUS FOR DETERMINING THE TRANSMISSION TIME INTERVAL LENGTH

Embodiments relate to a method and apparatus and in particular but not exclusively to a method and apparatus to be used to cause a transmission time interval length to be used.

A communication system can be seen as a facility that enables communication sessions between two or more entities such as fixed or mobile communication devices, base stations, servers and/or other communication nodes. A communication system and compatible communicating entities typically operate in accordance with a given standard or specification. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN).

A user can access the communication system by means of an appropriate communication device. A communication device of a user is often referred to as user equipment (UE) or terminal. Typically a communication device is used for enabling receiving and transmission of communications such as speech and data. In wireless systems a communication device provides a transceiver that can communicate with another communication device such as e.g. a base station of an access network and/or another user equipment. The communication device may access a carrier provided by a station, for example a base station, and transmit and/or receive communications on the carrier.

An example of communication systems attempting to satisfy the increased demands for capacity is an architecture that is being standardized by the 3rd Generation Partnership Project (3GPP). The communication system is often referred to as Universal Mobile Telecommunications System (UMTS) radio-access technology with the enhancements for High Speed Packet Access (HSPA) which improves the downlink and uplink transmission (HSDPA, HSUPA), and the long-term evolution (LTE) of the Universal Mobile Telecommunications System (UMTS) radio-access technology. The HSPA and LTE enhancements aim to achieve various improvements, for example reduced latency, higher user data rates, improved system capacity and coverage, reduced cost for the operator and so on. A further development of the LTE is often referred to as LTE-Advanced. The various development stages of the 3GPP specifications are referred to as releases.

According to one embodiment, there is provided a method comprising: receiving information on a requested transmission time interval length for use by a user equipment; determining if said requested transmission time interval length can be used; and if not causing a different transmission time interval length to be used by said user equipment.

The receiving information may comprise receiving one of a set of random access channel preambles.

Each random access channel preamble may be associated with a particular resource.

The particular resource may comprise a dedicated channel.

At least one of said resources may be configured to be usable with a first transmission time interval length and a second transmission time interval length.

A least one resource of a set of resources may be associated with a plurality of preambles.

The preambles may be configured to be divided at least into a first set and a second set.

The first set of preambles may be associated with one transmission time interval length and said second set of preambles may be associated with a different transmission time interval length.

The first set of preambles may be associated with a first and a second set of user equipment and the second set of preambles are associated with the second set of user equipment.

The first set of preambles may be associated with one transmission time interval length and said second set of preambles may be divided into a plurality of subsets, each of said subsets being associated with a different transmission time interval length.

The first set of preambles may be associated with a first set of user equipment only and said second set of preambles may only be associated with a second set of user equipment.

The first set of preambles may be associated with one transmission time interval length and said second set of preambles may be associated with a different transmission time interval length.

The first set of preambles may be associated with a first and a second set of user equipment and said second set of preambles may only be associated with the second set of user equipment.

The first set of preambles may be associated with a first set of user equipment, said second set of preambles may be associated with a first transmission time interval length and a second set of user equipment, and a third set of preambles may be associated with a second transmission time interval length and said second set of user equipment.

The first set of preambles may be associated with a first transmission time interval length and information is provided to distinguish user equipment using said first transmission time interval length from user equipment using a second transmission time interval length.

The information may comprise absolute grant channel information.

A first set of resources may be are provided associated with a first transmission time interval length and an indication may be provided indicating which of said first set of resources is also available with a second transmission time interval length.

The causing may comprise providing information to said user equipment.

The causing comprises providing information to said user equipment using an acquisition channel.

The information may be provided with acquisition information.

The method described previously may be carried out in a base station.

According to another embodiment, there is provided a method comprising: receiving a preamble from a user equipment, said preamble identifying a resource out of a set of resources, and transmission time interval length out of a set of transmission time interval lengths; determining if said identified resource and/or transmission time interval length should be used or if another resource and/or transmission time interval length should be assigned; and using said determined resource and transmission time interval length in data transmission.

This method may be carried out in a user equipment.

According to another embodiment, there is provided an apparatus comprising: means for receiving information on a requested transmission time interval length for use by a user equipment; means for determining if said requested transmission time interval length can be used; and means for causing, if said requested transmission time interval cannot be used, a different transmission time interval length to be used by said user equipment.

According to another embodiment, there is provided an apparatus comprising: a receiver configured to receive information on a requested transmission time interval length for use by a user equipment; a controller configured to determine if said requested transmission time interval length can be used; and to cause, if said requested transmission time interval cannot be used, a different transmission time interval length to be used by said user equipment.

According to another embodiment, there is provided an apparatus, said apparatus comprising at least one processor and at least one memory including computer program code, the at least one memory and computer program code configured to with the at least one processor cause the apparatus at least to; receive information on a requested transmission time interval length for use by a user equipment; determine if said requested transmission time interval length can be used; and cause, if said requested transmission time interval cannot be used, a different transmission time interval length to be used by said user equipment.

The apparatus may comprise a base station.

The information may comprise one of a set of random access channel preambles.

Each random access channel preamble may be associated with a particular resource.

At least one of said resources may be configured to be usable with a first transmission time interval length and a second transmission time interval length.

At least one resource of a set of said resources may be associated with a plurality of preambles.

The preambles may be configured to be divided at least into a first set and a second set.

The first set of preambles may be associated with one transmission time interval length and said second set of preambles may be associated with a different transmission time interval length.

The first set of preambles may be associated with a first and a second set of user equipment and said second set of preambles may only be associated with the second set of user equipment.

The first set of preambles may be associated with a first transmission time interval length and said second set of preambles is divided into a plurality of subsets, each of said subsets being associated with a different transmission time interval length.

The first set of preambles may be associated with a first set of user equipment only and said second set of preambles may be only associated with a second set of user equipment.

The first set of preambles may be associated with a first transmission time interval length and a first set of user equipment, said second set of preambles may be associated with the first transmission time interval length and a second set of user equipment, and a third set of preambles may be associated with a second transmission time interval length and said second set of user equipment.

Information may be provided to distinguish user equipment using said first transmission time interval length from user equipment using a second transmission time interval length.

A first set of resources may be provided associated with a first transmission time interval length and an indication may be provided indicating which of said first set of resources is also available with a second transmission time interval length.

According to another embodiment, there is provided an apparatus comprising: means for causing information to be sent on a requested transmission time interval for use by a user equipment; means for receiving information indicating if said requested transmission time interval can be used or in another transmission time interval length should be used; and means for using the transmission time interval length indicated by said received information.

According to another embodiment, there is provided an apparatus, said apparatus comprising at least one processor and at least one memory including computer program code, the at least one memory and computer program code configured to with the at least one processor cause the apparatus at least to: Cause information to be sent on a requested transmission time interval for use by a user equipment; Receive information indicating if said requested transmission time interval can be used or in another transmission time interval length should be used; and use the transmission time interval length indicated by said received information. The apparatus may be provided in a UE.

It should be appreciated that a feature described in relation to one aspect may be used in another.

Embodiments will now be described, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 and 6 to assist in understanding the technology underlying the described examples.

Figure 1:
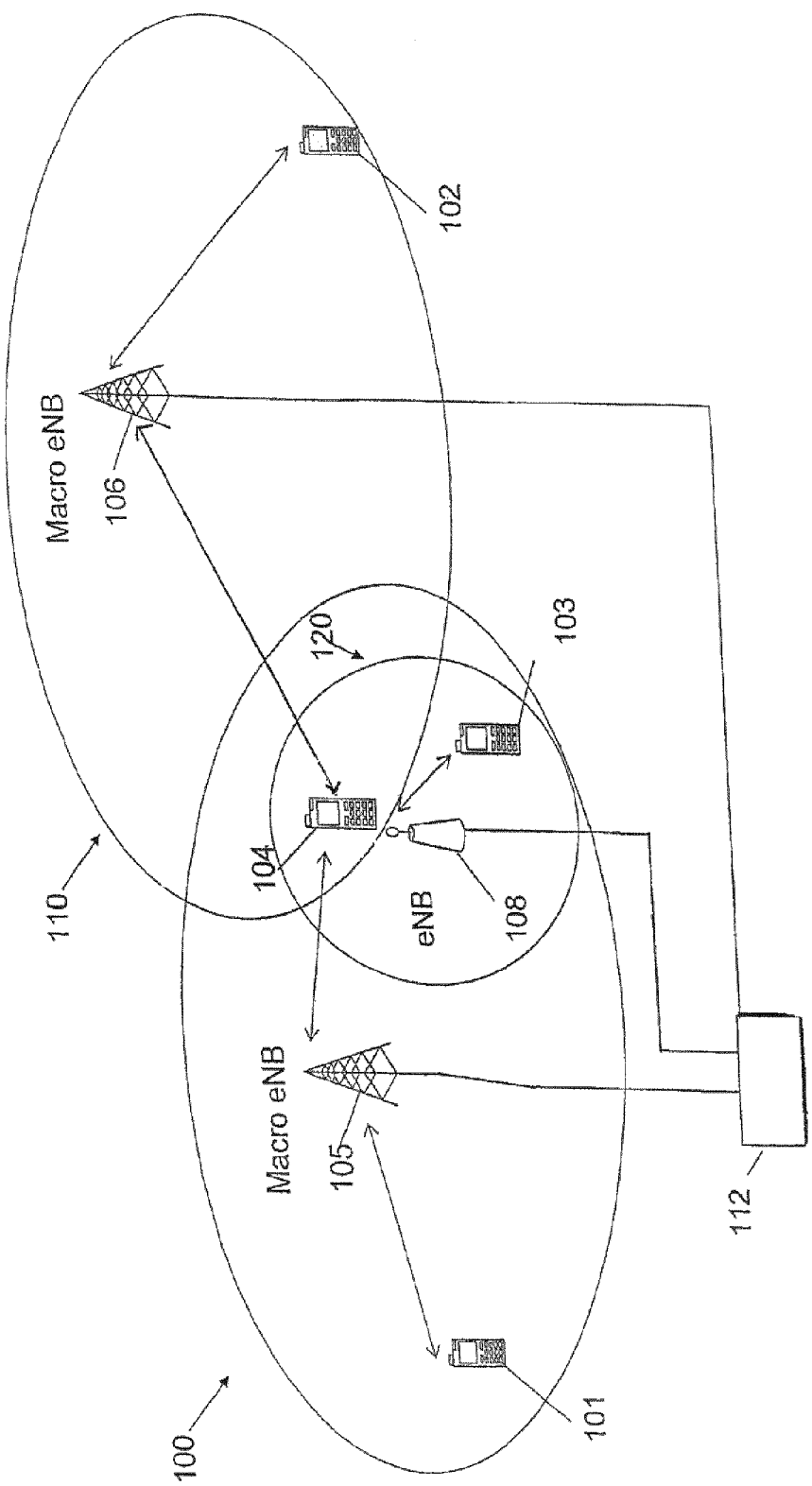
FIG. 1 shows a schematic diagram of a network according to some embodiments.

A mobile communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each mobile communication device 101, 102, 103, 104, and base station 105, 106, and 108 may have one or more radio channels open at the same time and may send signals to and/or receive signals from more than one source.

Base stations 105, 106, 108 may be controlled by a radio network controller RNC 112 so as to enable operation thereof and management of mobile communication devices 101, 102, 103, 104 in communication with the base stations 105, 106, 108.

The cell borders or edges are schematically shown for illustration purposes only in FIG. 1. It shall be understood that the sizes and shapes of the cells or other radio service areas may vary considerably from the similarly sized omni-directional shapes of FIG. 1.

In particular, FIG. 1 depicts two wide area base stations 105, 106, which can be macro-NBs (node B) 105, 106. The macro-NBs 105, 106 transmit and receive data over the entire coverage of the cells 100 and 110 respectively. FIG. 1 also shows a smaller base station or access point which in some embodiments can be a pico NB 108. The coverage of the smaller base station 108 may generally be smaller than the coverage of the wide area base stations 105, 106. The coverage provided by the smaller node 108 overlaps with the coverage provided by the macro-NBs 105, 106. In some embodiments, the smaller node can be a femto or Home NB. Pico NBs can be used to extend coverage of the macro-NBs 105, 106 outside the original cell coverage 100, 110 of the macro-NBs 105, 106. The pico NB can also be used to provide cell coverage in "gaps" or "shadows" where there is no coverage within the existing cells 100, 110 and/or may serve "hot spots".

It should be noted that in some embodiments the pico NB or smaller NBs may not be present. In alternative embodiments, only pico or smaller NBs may be present. In some embodiments there may be no macro NBs.

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

Some non-limiting examples of the recent developments in communication systems are the High Speed Packet Access (HSPA) for uplink and downlink transmission or long-term evolution (LTE) of the Universal Mobile Telecommunications System (UMTS) that is being standardized by the 3rd Generation Partnership Project (3GPP). As explained above, further development of the LTE is referred to as LTE-Advanced.

Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

Although not shown in FIG. 1, a base station may provide a plurality of cells.

Figure 2:
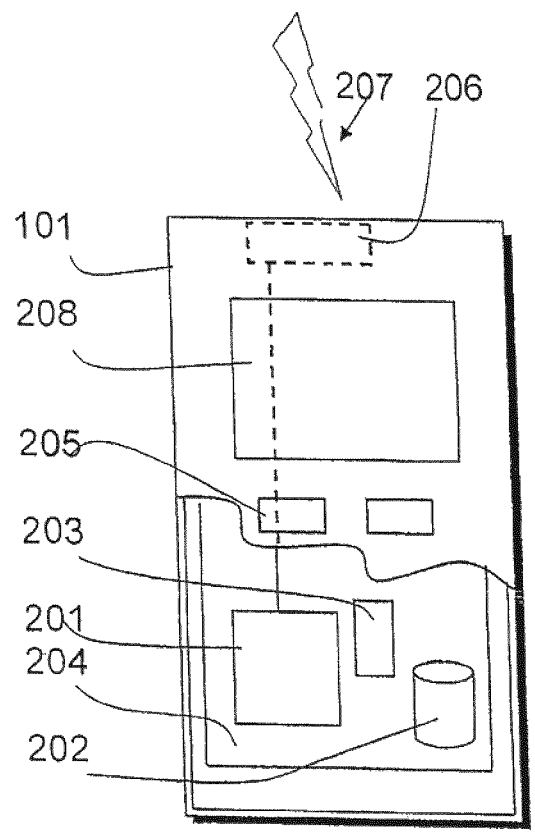
FIG. 2 shows a schematic diagram of a mobile communication device according to some embodiments.

The communication devices will now be described in more detail in reference to FIG. 2. FIG. 2 shows a schematic, partially sectioned view of a communication device 101 that a user can use for communication. The communication device may be a mobile communication device. A communication device is often referred to as user equipment (UE) or terminal. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. A user may also be provided broadcast or multicast data. Non-limiting examples of the content include downloads, television and radio programs, videos, advertisements, various alerts and other information.

The user equipment 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

The user equipment is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the user equipment by means of a suitable user interface such as a key pad 205, voice commands, touch sensitive screen or pad, combinations thereof or the like. A display 208, a speaker and a microphone can be also provided. Furthermore, a user equipment may comprise appropriate connectors (either wired or wireless) to other devices and/or for connecting external accessories, for example hands-free equipment, thereto.

Figure 3:
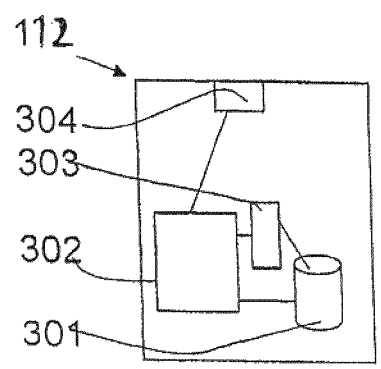
FIG. 3 shows a schematic diagram of a radio network according to some embodiments.

FIG. 3 shows an example of the RNC 112. The RNC 112 comprises at least one memory 301, at least one data processing unit 302, 303 and an input/output interface 304. Via the interface the RNC can be coupled a plurality of base stations.

Figure 6:
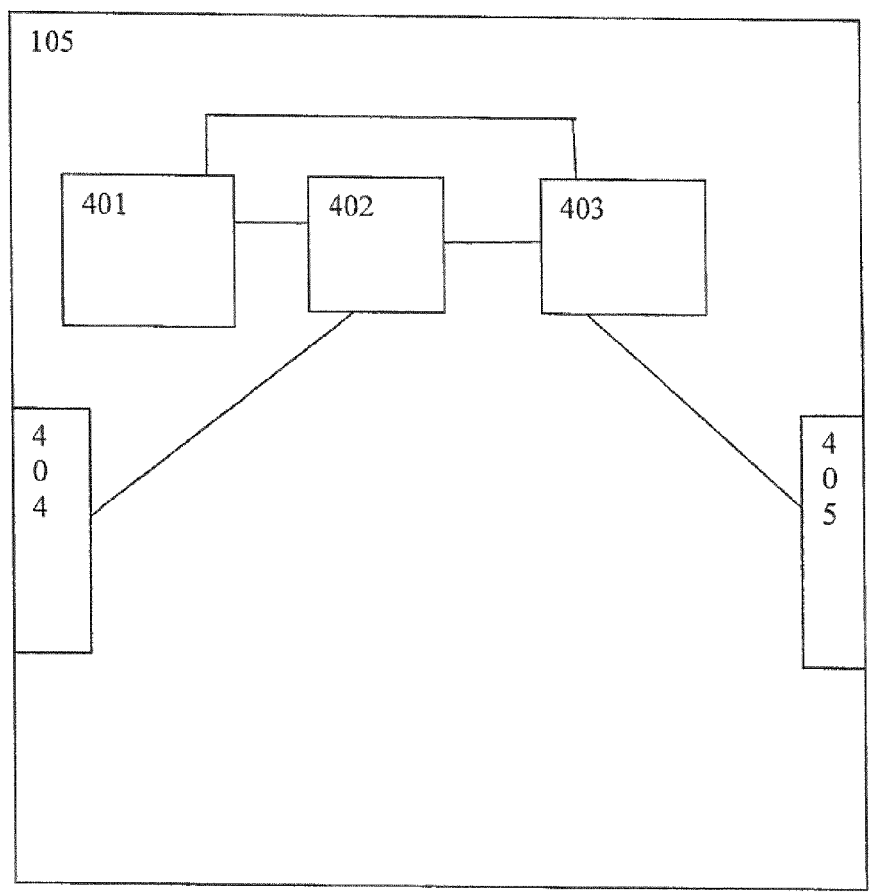
FIG. 6 shows a base station according to some embodiments.

Reference is made to FIG. 6 which shows a base station 105. The base station comprises at least one memory 401 and at least one data processing unit 402 and 403. The base station is provided with a first interface 404 for interfacing with the RNC. The base station is provided with a second interface 405 which is a wireless interface for interfacing with user equipment.

A UE which can operate in conjunction with HSPA may a have a plurality of states, in which the UE can exchange data with the wireless network (via the Node B). One state is a CELL_DCH (dedicated channel) which is used when for example a large amount of data is to be transferred. In the CELL_DCH state a dedicated physical channel may be allocated to the UE in both the uplink and downlink directions.

In a CELL_FACH (forward access channel) state, there may be no dedicated physical channel is allocated to the UE. The UE may continuously monitor a FACH in the downlink. When needed, the UE may be assigned a default common or shared transport channel in the uplink (e.g. RACH—random access channel or Common E-DCH channel) that can be used by the UE for data delivery. The UE may be in the Cell_FACH without an UL connection. When the UE needs to send something, the UE will initiate the connection establishment with a PRACH preamble to deliver the data either over RACH or Common E-DCH.

Some embodiments may be used with arrangements where two or more different TTI lengths (transmission time intervals) are usable. A TTI is the duration of a transmission on the radio link. This is a measure of the size of the data block passed from a higher network layer to the radio link layer. A longer TTI may be used for worse radio conditions and a shorter TTI is used for better radio conditions. These TTIs may be used for a dedicated channel (DCH) or any other suitable channel. This channel may be an uplink channel. By way of example the TTIs may be 2 ms or 10 ms. However it should be appreciated that alternative or additional TTI values may be used. In one embodiment, the TTIs may be used for uplink E-DCH (enhanced dedicated channel) transmissions in the Cell_FACH state for the HSPA radio.

It should be appreciated that alternatively or additionally embodiments may be used in non HSPA radio situations or any other suitable radio situation.

Currently the 3GPP HSPA Release 6 defined the E-DCH (HSUPA) for uplink for the dedicated channel state (Cell_DCH). Two Transmission Time Interval (TTI) lengths were defined, 2 ms TTI for faster data rates, but with smaller coverage, and 10 ms for lower data rates, but greater coverage.

The 3GPP HSPA Release 8 extends the E-DCH to the common channel state (Cell_FACH), to replace the old uplink random access channel. The TTI length had to be selected on a cell level, that is in one cell, all Cell_FACH E-DCH connections were pre-defined to be either 2 ms or 10 ms TTI.

In 3GPP release 11, an Enhanced Cell_FACH is being worked on. It has been suggested that the 2 ms and 10 ms TTI E-DCH coexist in the same cell for the Cell_FACH state users. The legacy Rel-8 Cell_FACH UEs are provided with the list of the cell's Cell_FACH E-DCH resources in the System Information Broadcast, and in the access phase the UE is pointed to a specific resource from the list using AICH acquisition indication channel.

It has been suggested that a UE would indicate which TTI length the UE is interested in using (a cell edge UE would need to indicate 10 ms as 2 ms may not be able to provide the coverage), but the Node B has means to override the UE preference, e.g. if the UE asked for 2 ms TTI, but all 2 ms TTI resources were already in use, but 10 ms TTI resources were still available.

Figure 4:
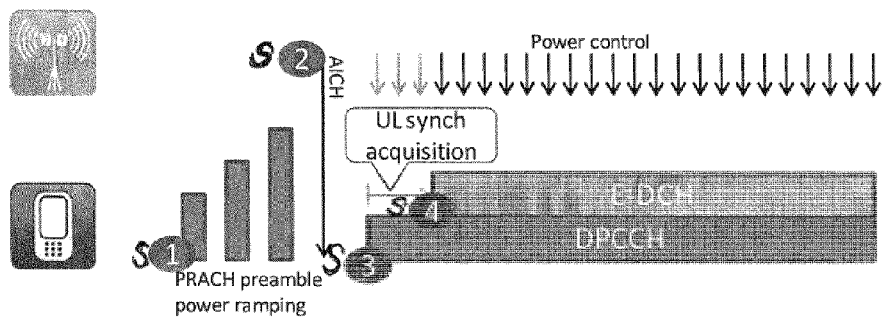
FIG. 4 shows an acquisition procedure.

Reference is made to FIG. 4 which shows a Cell_FACH E-DCH acquisition procedure. As schematically shown, in a first step S1, the UE initiates the acquisition procedure with PRACH (Physical Random Access Channel) preamble power ramping. The used preamble points to a default E-DCH resource.

In step S2, the Node B detects sufficient power on PRACH preamble and provides the UE with an Acquisition Indication over the AICH channel. The AICH channel can be used either to just grant the UE the default E-DCH resource associated with the used PRACH preamble, or an Extended Acquisition Indication may be used to point the UE to use another E-DCH resource.

In step S3, the UE detects the AICH and starts transmitting the DPCCH (Dedicated Physical Control Channel) on the assigned resource. The Node B starts transmitting the uplink power control commands In step S4, after the power control preamble, the UE starts transmitting the E-DCH data channel. In some embodiments, step S4 may take place at the same time or later than step S3.

In Rel-8, the system information can indicate a list of up to 32 E-DCH resources available in the cell, and the AICH channel is capable of supporting up to 32 E-DCH resources, that is, the AICH can point a resource out of a maximum set of 32.

One way of supporting both 2 and 10 ms TTI values in the same cell would be to allocate in the system information N E-DCH resources for 10 ms TTI (visible for example to the legacy Rel-8 UEs), and M resources for 2 ms TTI (visible only to the Rel-11 and higher UEs), where N+M≤32. Thus, the legacy Rel-8 UEs will see the N 10 ms TTI E-DCH resources, while the Rel-11 (and higher) UEs will see both N 10 ms TTI and M 2 ms TTI resources. The approach requires that a limited number of the E-DCH resources, for example 32, is partitioned into two independent pools, so that the legacy Rel-8 UEs cannot utilize resources from the 2 ms TTI pool.

In some embodiments, a common pool of the E-DCH resources is provided and the network indicates to UEs which TTI length to use. Some embodiments may use the PRACH preamble to indicate the UE's initial preference of a specific TTI length in an efficient and backwardly compatible way. At the moment, the PRACH space is already partitioned between the R99 only capable UE and the high speed capable ones. In other words there are preambles the network allocates for R99 RACH only capable UEs and different preambles for Common E-DCH capable UEs. No new preambles were introduced in Rel-8, so this requires that the set available since Rel'99 is split to two, so that the Rel'99 devices are told to use one subset and common E-DCH capable devices another subset so that the Node B knows the type of access from the preamble used In some embodiments, the preamble space is further partitioned by introducing a third set of PRACH preambles made available only to the Rel-11 (or higher) UEs. These preambles will indicate a preference for the TTI length other than the TTI length associated with the PRACH preambles as per the Rel-8 functionality. As an example, if the Rel-8 system information sets the TTI length to 10 ms for common E-DCH access, the Rel-8 PRACH preambles implicitly refer to the 10 ms TTI selection. The Rel-11 (or higher) UEs will use a third subset of PRACH preambles when they want to indicate a preference for 2 ms TTI.

In some embodiments, the third set of PRACH preambles, is partitioned further into 2 and 10 ms TTI preference so that the Rel-11 (or higher) UEs do not use the Rel-8 PRACH preamble set. One advantage of this approach is that when the network gets a preamble, the network will know if the preamble is received from a Rel-8 or Rel-11 (or higher) UE. With the previous embodiment, the network is not able to determine from the preamble if the preamble is received from a Rel-8 or Rel-11 (or higher) UE when the preamble from the legacy Rel-8 PRACH preamble set is detected. This latter approach means that the preambles are partitioned between R99, Rel-8, Rel-11 2 ms TTI and Rel-11 10 ms TTI functionality, resulting in four different preamble blocks. Currently, there are 16 preamble signatures defined in the standard. However, in some embodiments, not all of these signatures are allocated. Alternatively or additionally in some embodiments additional signatures are provided which extend the signature space beyond 16.

Figure 7:
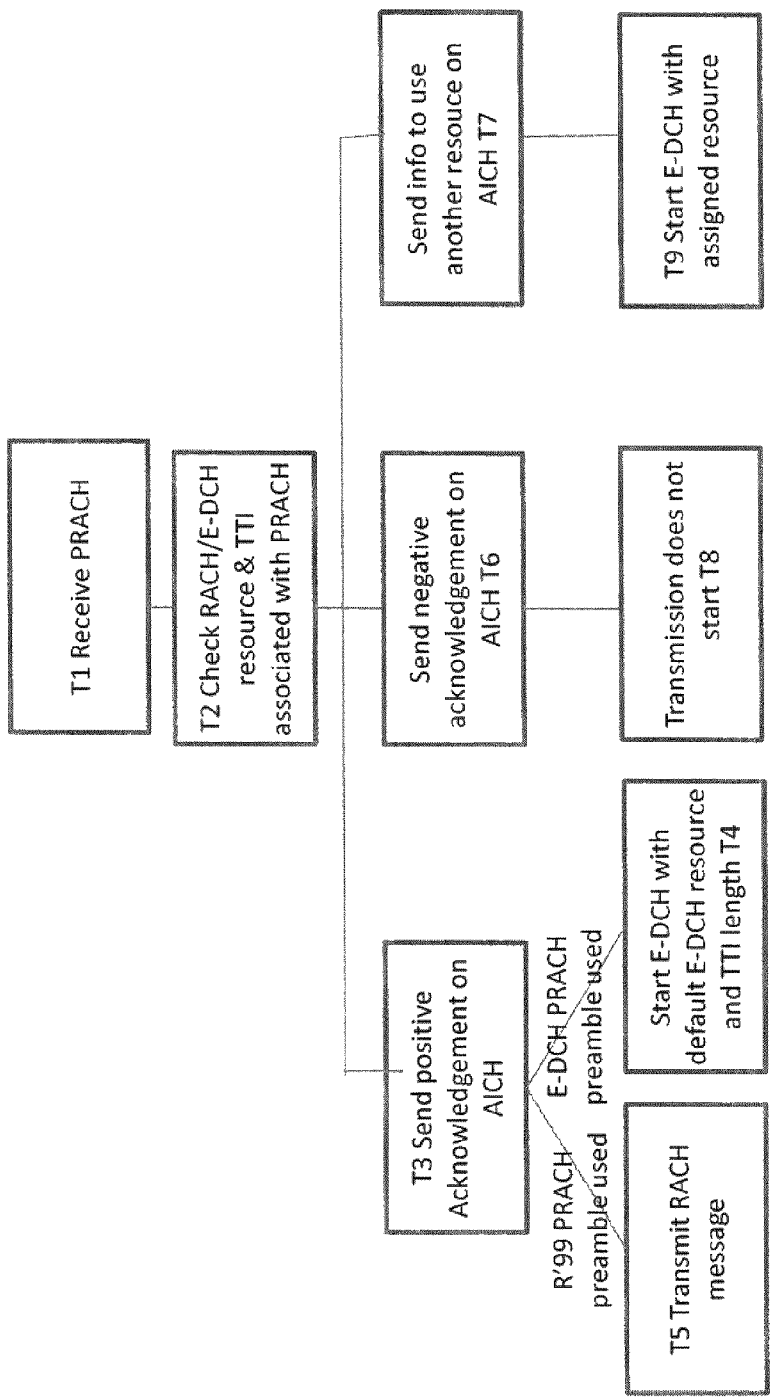
FIG. 7 shows some embodiment methods.

Some embodiments will now be described with reference to FIG. 7 which shows some methods of embodiments.

In step T1, a PRACH preamble is received by a base station from a UE. The UE selects a PRACH preamble signature out of a set of PRACH preamble signatures the cell indicates being available. The signature space is divided to non-overlapping subsets so that the used preamble signature unambiguously identifies if the UE is doing a Rel'99 RACH access, a Rel-8 'default TTI length' Common E-DCH access, or a Rel-11 Common E-DCH access with one or the other TTI length being requested. So in some embodiments there may be a split to three or four preamble signatures as described previously. (R'99, R8 with default TTI length, R11 or higher with the other TTI length; or R'99, R8 with default TTI length, R11 or higher with default TTI length, R11 or higher with the other TTI length). In one embodiment, all four sets are provided in the system information broadcast, but the R8 with default TTI length subset and the R11 or higher with default TTI length may be configured to be the same.

In step T2, the base station and/or RNC will check if the default E-DCH resource and TTI associated with the PRACH preamble received from the UE can be allocated.

If the RNC and/or base station can confirm the UE's initial preference for the TTI selection and the default E-DCH resource associated with the used PRACH preamble is available, the RNC and/or base station can send a positive answer or acknowledgement over the AICH channel to the UE. This is in step T3.

Step T3 is followed by step T4 or step T5. If a release '99 PRACH preamble is used, then step T3 is followed by step T5 in which a RACH message is transmitted by the UE.

Step T3 is followed by step Y4 if an E-DCH PRACH preamble is used. In step T4, the E-DCH is started with its default E-DCH resource and TTI length. This results in the UE using the TTI length for which the UE indicated a preference.

The allocation of the E-DCH, checking the TTI selection and sending of the response on the AICH may be performed by the base station and/or the RNC.

Referring back to step T2, if the base station and/or RNC determines that the default E-DCH resource and TTI associated with the PRACH preamble received from the UE cannot be allocated, the next step is either step T6 or T7. If there is no suitable resource available, the next step is step T6.

In step T6, a negative acknowledgement is sent on the AICH.

This is followed by step T8 where the transmission does not start.

If there is not suitable resource available but another resource can be used, then the next step is step T7. In step T7, information to use another resource is sent on the AICH.

Step T9 follows step T7. In step T9, the E-DCH is started with the assigned resource. The TTI length used can be provided either being indicated in the AICH message and/or in alternative embodiments being associated with the assigned resource.

Figure 5:
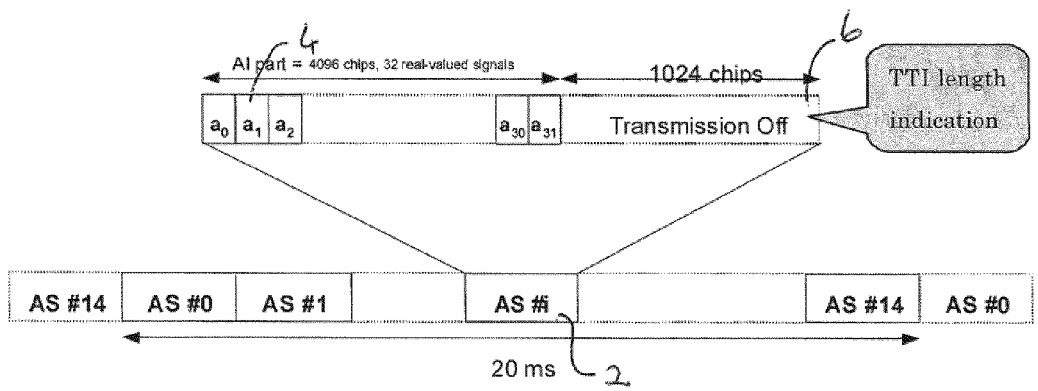
FIG. 5 shows an acquisition indicator channel.

Thus if the network detects in step T2 that the used preamble belonged to a Rel-11 PRACH preamble set, and wants to change the TTI length to the value other than the UE's initial preference, then the next step is T7. In one embodiment, the AICH is extended to use a currently unused 1024 chip part to provide a special TTI indicator field. In this regard reference is made to FIG. 5. FIG. 5 shows a structure of the AICH. The AICH carries AIs 2. The channel spans two radio frames (20 ms) and has 15 access slots. Each access slot may carry a set of AIs and an E-AI (extended-AI) 2. Each access slot's AI part has 32 real value signals 4 (4096 chips) and there is currently no transmission in the remainder 6 of the AI −1024 chips. In some embodiments, information on the TTI to be used is provided in the currently unused part of the AI slot. By this means, the network can assign the E-DCH resource and change, if needed, the selected TTI size. Alternatively or additionally the E-AI is used to assign to the UE other than the default E-DCH resource. If the explicit TTI length indication is sent in the spare 1024 chips of AICH, then that may be sent even when the default resource is used. Thus an explicit TTI length indication is provided in the AICH indicating if the UE should use 2 or 10 ms TTI.

In another embodiment, the common set of the E-DCH resources is virtually partitioned into the set of 10 ms and 2 ms TTIs. As mentioned a UE needs to know that it should use either 2 or 10 ms TTI. Whenever the network wants to change the TTI size to the value other than what a Rel-11 UE has selected as a default one, the network can point to a particular E-DCH resource, where the virtual partitioning will govern whether it is 2 or 10 ms one. Physically, it is still the same pool that in some embodiments may be circulated between all the Rel-8 and Rel-11 UEs. This virtual partitioning is visible only to the Rel-11 or higher UEs.

Consider that there are sixteen resources in the cell. Rel-8 UEs understand that all of these are 10 ms TTI resources. Rel-11 UEs could see that first 8 of them can be used with 2 and 10 ms TTI and the last 8 with 10 ms TTI only. The UE transmitting a preamble seen available by Rel-8 UE (given in the system information) would point to any one of these 16 resources by default, and be considered as 10 ms TTI request (it would not be known whether the UE was a Rel-8 or Rel-11 UE). If an E-AI is used to point the UE to another E-DCH resource it would still be considered a 10 ms TTI UE.

The UE transmitting a preamble not known to be available by the Rel-8 UE (given in a Rel-11 extension of system information and ignored by Rel-8 UEs) would point to one of the first 8 E-DCH resources and be understood as 2 ms TTI request by a Rel-11 UE. If an E-AI is used to point the UE to a non-default E-DCH resource then 2 ms TTI would be used if the assigned resource was one of the first 8, otherwise 10 ms TTI would be used.

Any resource assigned to the UE using a PRACH preamble from the set available to the legacy Rel-8 UEs will not change the TTI allocation. With regards to the Rel-11 (or higher) UEs, for which this partitioning is visible, will follow a simple rule. A UE using a PRACH preamble from the set available only to the Rel-11 UEs will use the new TTI length association visible only to the Rel-11 UEs in such a way that some of the resource the Rel-8 UE understands as 10 ms TTI resources would be associated with 2 ms TTI for the Rel-11 UEs leading to both Rel-8 and Rel-11 UEs seeing the same set of E-DCH resources, but Rel-8 UEs understanding all of them to be associated with one TTI length, when the Rel-11 UEs would see them split in one set with one TTI length and another set with another TTI length. The TTI length selection will be governed by the actually assigned E-DCH resource (using AICH channel and potentially also the extended AI mechanism defined for Rel-8). Such an approach allows the AICH channel structure to be unchanged and circulates the common pool of the E-DCH resources flexibly between the Rel-8 and Rel-11 UEs.

Thus in embodiments there is a first set of PRACH preambles which are only used by Rel 8 UEs. There is a second set of PRACH preambles which are only used by Rel 11 UEs or higher. The first and second set of preambles map to E-DCH resources belonging to the same set. If the first set of preambles is used, then the E-DCHs will have a TTI of 10 ms. If the second set of preambles are used then the same set of E-DCHs is divided into two subsets, one have a TTI of 2 ms and the other having a TTI of 10 ms.

In some embodiments, there may be only two sets of preambles (or of the three sets are the same), one for REL8 UEs that also REL11 UEs use if they want 10 ms TTI, and another for REL11 UEs when they want 2 ms TTI. The same resources (UL scrambling code, DL feedback channel allocation) are used with one or the other TTI length.

Further, there may be fewer preambles in the two sets than there are E-DCH resources in the E-DCH resource set. The default preamble to E-DCH resource mapping in this context may be considered to be a mapping from two sets to one set.

By way of example, consider a case where there are 4+2 PRACH preambles in the two sets and 8 E-DCH resources in use in the system. The default mapping of the preambles would point to the E-DCH resources in one set, but they are not the same E-DCH resources. The assignment to a non-default resource would still point to this one set of E-DCH resources regardless of from which preamble set the received preamble was from.

The virtual partitioning provides a common pool of the E-DCH resources. In some embodiments, this may avoid changes to the AICH channel.

Some embodiments may use PRACH preamble signature partitioning and AICH resource assignment.

In order to manage the pre-Rel-11 UEs incapable of adapting their TTI length in Cell_FACH state and the Rel-11 UEs capable of doing so, the operational mode in a cell may be one of the following:
 1. Default (Rel-8) TTI length of either 2 ms or 10 ms, and the additional (Rel-11) TTI length is the other TTI length; or
 2. Only 2 or 10 ms TTI length is used in the cell (Rel-8 operation)

Consider the case where the default, or Rel-8, TTI length is 10 ms, and in addition the Rel-11 devices can request a 2 ms TTI.

In one embodiment, the design for simultaneous existence of 2 ms and 10 ms TTI in the Cell_FACH should target for the deployment, where Rel-8 UEs use 10 ms TTI, and the Rel-11 UEs could additionally indicate a preference for 2 ms TTI.

Coexistence of Rel-8 and Rel-11 Cell_FACH E-DCH UEs may be provided in some embodiments.

The Rel-8 approach is to separate the E-DCH access attempts from Rel'99 RACH access attempts based on the used PRACH preamble signature. If a Rel-11 UE wants to use the TTI available for the Rel-8 users, and there is no need for the network to override this decision, the Rel-11 UEs can use the PRACH preamble reserved for Rel-8 E-DCH access attempts. This approach is practical for the cases where the Rel-8 TTI is 10 ms. A Rel-11 UE can request a 2 ms TTI in this environment. This can be achieved in some embodiments by setting aside a separate set of PRACH preambles for Rel-11 2 ms TTI access.

Alternatively or additionally, the E-DCH PRACH preamble space may be partitioned so that there are preambles indicating a preference for the 2 ms TTIs in the dual TTI cell configuration. In some embodiments, the network should be able to override the UE's preferred TTI length. However, this may only be needed if the UE does not prefer the cell's 'default' TTI length. So in case of the 'default' (10 ms) PRACH preamble, the procedure can follow the Rel-8 definitions for both the Rel-8 and Rel-11 UEs. Thus, when the 2 ms TTI length, is requested by the Rel-11 UE and that decision should be changeable to 10 ms TTI, the AICH either confirms or rejects the preferred TTI request implied by the choice of the preamble.

The Rel-8 Common E-DCH System Information provides an E-DCH TTI length for a set of up to 32 resources, where all resources share the same TTI length. As discussed, there is a trade off between hard partitioning the E-DCH resources into two independent sets for 2 and 10 ms TTIs while keeping the AICH channel untouched, and having the common pool of E-DCH resources, which requires further changes on the AICH channel.

In order to be able to use the same set of allocated resources (UL scrambling code, DL feedback channel allocations) with both 10 ms and 2 ms TTI E-DCH, the Rel-8 Common E-DCH System Information can be extended with an indication of which of the resources usable for the Rel-8 accesses are also available for the other TTI access for Rel-11 devices. This can be achieved with either an explicit 32-bit bitmap, or with a single index, below which only 10 ms TTI (Rel-8) access is allowed and above which both 2 and 10 ms TTI is allowed. The single index pointing to the division point in the E-DCH set may require 5 bits in one embodiment. This approach would allow for all the resources to be assigned to 10 ms TTI use, and a subset of them also for 2 ms TTI use. Whenever the Rel-11 UE asks for the 2 ms TTI, it can be assigned with the default 2 ms TTI E-DCH resource associated with the default 2 ms TTI E_DCH resource associated with the used preamble or directed either to a different 2 ms E-DCH resource, or to the one corresponding to the 10 ms TTI. At the same time, all the Rel-8 UEs will see a common pool of the E-DCH resources corresponding to the 10 ms TTI length.

In another embodiment, the common pool of the E-DCH resources is provided with pseudo (virtual) partitioning of the resources for the purpose of supporting Rel-11 UEs.

The E-AGCH (absolute grant channel) code may not always be shareable between two TTI lengths, and thus a second E-AGCH code information may be provided. The UE picks the one E-AGCH code associated with the TTI length it starts using.

In Release 8 the PRACH preamble space is partitioned between Rel-99 RACH access attempts and Rel-8 common E-DCH access attempts. With ²/₁₀ ms TTI partitioning in addition, a third and optionally a fourth may be provided. For example Partition 1—Rel'99 RACH access request Partition 2—Rel-8 Common E-DCH access request with cell's default TTI length and default E-AGCH code Partition 3—Rel-11 Common E-DCH access request with cell's default TTI length and default E-AGCH code, could be configured to fully overlap with Partition 2, if there is no need to identify Rel-11 UEs from Rel-8 UEs.

Partition 4 Rel-11 Common E-DCH access request with 'the other' TTI length and 'the other' E-AGCH code.

Partition 1 UEs would be ACKed with AI as in Rel'99.

Partition 2 UEs would be ACKed with AI to the default E-DCH resource (with cell's default Rel-8 TTI length) corresponding to the used preamble, or directed to another E-DCH resource with E-AI as in Rel-8.

Partition 3 UEs would follow the same rules as partition 2 UEs, but would be identified to be Rel-11 UEs for potential other uses in the network.

Partition 4 UEs would be ACKed with AI to the default E-DCH resource (with cell's 'other TTI length') corresponding to the used preamble, or directed to another E-DCH resource with E-AI as in Rel-8. In that case, the TTI length to be used would depend on the assigned E-DCH resource, as governed by the pseudo-partitioning of the E-DCH resources.

A UE may keep the assigned TTI length until the E-DCH resource is released. Alternatively, the TTI length may be changed during the use of an E-DCH transmission.

Two examples will now be discussed. In a first example, there are more preambles than resources. Preamble set one of four preambles are available to Rel-8 and Rel-11 UEs, associated with the cell's Rel-8 TTI length. The preamble set two is only available to Rel-11 UEs, associated with the 'other' TTI length. Each preamble maps to one default E-DCH resource. Each preamble set maps to a TTI length. The first to fourth preambles of the first set are mapped to respective ones of a set of four E-DCHs. The first and second preambles of the second set are respectively mapped to the third and fourth ones of the set of four E-DCHs. When a UE uses a preamble out of set one, and is assigned to another resource than the default association, it will use the cell's Rel-8 TTI length. When a UE uses a preamble out of set two (a Rel-11 UE), and is assigned to another resource than the default association, the TTI length to be used depends on which E-DCH resource was assigned to it Alternatively the TTI length is explicitly given in the last 1024 bits of AICH, and in this case all E-DCH resources can be assigned with either of the TTI lengths to a Rel-11 UE if the resource and/or TTI associated to the preamble needs to be changed.

In a second example, there are more resources than preambles. Set one of preambles has four preambles which are associated with resources one to four. The second set of preambles has two preambles which are respectively associated with resources seven and eight. It should be appreciated that sets one and two of the preambles have the same TTI and release association as set out in relation to the previous example. The first six E-DCH resources are for 10 ms TTI resources whilst resources 7 to 10 are 2 ms TTI resources for Rel 11 UEs and 10 ms TTI resources for Rel-8 UEs. Resources 5, 6, 9 and 10 are not by default associated with any preamble but the UE can be assigned with one of these by for example the AICH or E-AI.

It should be appreciated that the numbers of preambles in each set and the number of E-DCH resources are provided by way of example only and any other suitable number of resources may alternatively be used.

Some embodiments may be used where overloading the same actual resource with two resource indices allows for a reduction in the size of the system information broadcasting. In the described embodiments, reference has been made to a Node B. It should be appreciated that alternative embodiments may use any other suitable wireless access node, for example a base station or the like.

Reference has been made to the AICH channel. It should be appreciated that alternative or additionally one or more other suitable channels may be used.

In the described embodiments, reference has been made to Rel 8, Rel 11, Rel '99 etc. However, it should be appreciated that alternative embodiments may be used be with any additional or alternative versions (including future versions) of the 3GPP standard and/or any other standard.

The number of E-DCHs may be any suitable number.

Embodiments may alternatively or additionally be used with any channel other than the E-DCH.

Some embodiments have been described in relation to the RACH channel. Alternatively or additionally other embodiments may be used with other channels.

In some embodiments the preambles have been described as being divided into three groups (Rel '99, Rel 8 and Rel 11). It should be appreciated that this is by way of example only and in some embodiments the preambles may be divided into two groups or more than three groups.

In the described embodiments, reference has been made to a radio network controller. It should be appreciated that alternative embodiments may use any other suitable network controller which controls a wireless access node.

In the described embodiments, reference has been made to an eNB. It should be appreciated that alternative embodiments may use any other suitable wireless access node.

By way of background the physical random access procedure is described below. This procedure is as currently defined in Rel-8. Some embodiments may be used in conjunction with this procedure, with or without modification.

1 Derive the available uplink access slots, in the next full access slot set, for the set of available RACH sub-channels. Randomly select one access slot among the ones previously determined. If there is no access slot available in the selected set, randomly select one uplink access slot corresponding to the set of available RACH sub-channels from the next access slot set. The random function shall be such that each of the allowed selections is chosen with equal probability.

2 Randomly select a signature from the set of available signatures within the given ASC. The random function shall be such that each of the allowed selections is chosen with equal probability.

3 Set the Preamble Retransmission Counter to Preamble Retrans Max.

4 If the Preamble_Initial_Power is below the minimum level required, set the commanded Preamble Power to a value, which shall be at or above the Preamble_Initial_Power and at or below the required minimum power. Otherwise set the parameter Commanded Preamble Power to Preamble_Initial_Power.

In the case that the commanded Preamble Power exceeds the maximum allowed value, set the preamble transmission power to the maximum allowed power. In the case that the commanded Preamble Power is below the minimum level required, set the preamble transmission power to a value, which shall be at or above the commanded Preamble Power and at or below the required minimum power. Otherwise set the preamble transmission power to the Commanded Preamble Power. Transmit a preamble using the selected uplink access slot, signature, and preamble transmission power.

6 If no positive or negative acquisition indicator (AI≠+1 nor −1) corresponding to the selected signature is detected in the downlink access slot corresponding to the selected uplink access slot:

6.1 Select the next available access slot in the set of available RACH sub-channels within the given ASC (access service class).

6.2 Randomly select a new signature from the set of available signatures within the given ASC. The random function shall be such that each of the allowed selections is chosen with equal probability.

6.3 Increase the Commanded Preamble Power by ΔP0=Power Ramp Step [dB]. If the Commanded Preamble Power exceeds the maximum allowed power by 6 dB, the UE may pass L1 status ("No ack on AICH") to the higher layers (MAC) and exit the physical random access procedure.

6.4 Decrease the Preamble Retransmission Counter by one.

6.5 If the Preamble Retransmission Counter >0 then repeat from step 5. Otherwise pass L1 status ("No ack on AICH") to the higher layers (MAC) and exit the physical random access procedure.

7 If a negative acquisition indicator on AICH corresponding to the selected signature is detected in the downlink access slot corresponding to the selected uplink access slot.

7.1 If no Extended Acquisition Indicator signature set is configured in the cell, pass L1 status ("Nack on AICH received") to the higher layers (MAC) and exit the physical random access procedure.

7.2 If an Extended Acquisition Indicator signature set is configured in the cell, detect which one of the defined Extended Acquisition Indicator signatures is present.

7.2.1 If the detected Extended Acquisition Indicator signature and modulation symbol corresponds to 'NACK' as defined in [1], pass L1 status ("Nack on AICH received") to the higher layers (MAC) and exit the physical random access procedure.

7.2.2 If the detected Extended Acquisition Indicator signature and modulation symbol do not correspond to 'NACK', pass L1 status ("Ack on AICH received") with the corresponding E-DCH resource index to higher layers (MAC) and skip step 8.

8 If a positive acquisition indicator on AICH corresponding to the selected signature is detected in the downlink access slot corresponding to the selected uplink access slot, pass L1 status ("Ack on AICH received") with the default E-DCH resource index corresponding to the selected signature to higher layers (MAC), 9 Start transmitting DPCCH (dedicated physical control channel). The initial transmission power of DPCCH prior to starting the E-DCH transmission should be Pp-e [dB] higher than the power of the last transmitted preamble.

10 Proceed to transmitting E-DPCCH and E-DPDCH (E-dedicated physical data channel) as instructed by MAC layer after the defined number of TTIs of DPCCH only transmission has passed.

Various different embodiments have been described. It should be appreciated that one or more embodiments may be used at least partially in combination.

Various different methods have been shown. It should be appreciated that in some embodiments one or more of the method steps may be combined into a single step. In some embodiments, one or more of the method steps may be changed in terms of order. In some embodiments, one or more steps may be omitted. In some embodiments, one or more additional steps may be included. Parts of one method may be used with parts of another method.

One or more of the steps of any of the methods may be implemented using a respective arrangement. The respective arrangement may comprise circuitry and/or may be performed by one or more processors run computer code. One or more arrangements may be provided by common circuitry and/or the same one or more processors as used by another arrangement. Where one or more processors are provided, these processors may operate in conjunction with one or more memories.

The required data processing apparatus and functions of a base station apparatus, and RNC may be provided by means of one or more data processors. These may perform one or more of the method steps of a respective method.

The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip.

Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of embodiments may be implemented in hardware, while other aspects may be implemented in firmware or software which may be executed by a controller, microprocessor or other computing device, although embodiments are not limited thereto. While various aspects of the embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by one or more data processors in conjunction with one or more memories of a base station, or RNC.

One or more steps of a method of an embodiment may be performed when computer executable instructions are run on one or more processors.

Further in this regard it should be noted that any blocks of the logic flow as in the Figures may represent program steps, or interconnected logic circuits, blocks and functions, or a combination of program steps and logic circuits, blocks and functions.

The software or computer executable instructions may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention.

However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   receiving information on a requested transmission time interval length for use by a user equipment, wherein said receiving information comprises receiving one of a set of random access channel preambles, wherein said preambles are configured to be divided at least into a first set and a second set, wherein said first set of preambles is associated with a first transmission time interval length and said second set of preambles is associated with a second transmission time interval length, wherein said first set of preambles is associated with a first and a second set of user equipment and said second set of preambles is only associated with the second set of user equipment, wherein each random access channel preamble is associated with a particular resource, and wherein at least one of said resources is configured to be usable with said first transmission time interval length and said second transmission time interval length;
   determining whether said requested transmission time interval length can be used; and
   when said requested transmission time interval length cannot be used, causing a different transmission time interval length to be used by said user equipment, when the user equipment belongs to the second set of user equipment, wherein a first set of resources is provided associated with a first transmission time interval length and an indication is provided indicating which of said first set of resources is also available with a second transmission time interval length, and
   wherein a preamble space is divided into four partitions, a first partition being used for a Release '99 access request, a second partition being used for a Release 8 Common E-DCH access request with the first TTI length and first E-AGCH code, a third partition being used for a Release 11 Common E-DCH access request with the first TTI length and first E-AGCH code, and a fourth partition being used for a Release 11 Common E-DCH access request with the second TTI length and the second E-AGCH code.

2. The method as claimed in claim 1, wherein at least one resource of a set of said resources is associated with a plurality of preambles.

3. The method as claimed in claim 1, wherein said first set of preambles is associated with a first transmission time interval length and said second set of preambles is divided into a plurality of subsets, each of said subsets being associated with a different transmission time interval length.

4. The method as claimed in claim 3, wherein said first set of preambles is associated with a first set of user equipment only and said second set of preambles is only associated with a second set of user equipment.

5. The method as claimed in claim 1, wherein said first set of preambles is associated with a first transmission time interval length and a first set of user equipment, said second set of preambles is associated with the first transmission time interval length and a second set of user equipment, and a third set of preambles is associated with a second transmission time interval length and said second set of user equipment.

6. The method as claimed in claim 5, wherein information is provided to distinguish user equipment using said first transmission time interval length from user equipment using a second transmission time interval length.

7. A computer program product comprising a non-transitory computer-readable storage medium bearing computer program code embodied therein for use with a computer, the computer program code comprising code for performing the method of claim 1.

8. A method comprising:
   causing information to be sent on a requested first transmission time interval for use by a user equipment, wherein said information comprises receiving one of a set of random access channel preambles, wherein said preambles are configured to be divided at least into a first set and a second set, wherein said first set of preambles is associated with said requested first transmission time interval length and said second set of preambles is associated with a second transmission time interval length, wherein said first set of preambles is associated with a first and a second set of user equipment and said second set of preambles is only associated with the second set of user equipment;
   receiving information indicating that said requested first transmission time interval can be used or, when said requested first transmission time interval cannot be used, said second transmission time interval length should be used, wherein the received information comprises an indication indicating which of a first set of resources is also available with said second transmission time interval length; and
   using the transmission time interval length indicated by said received information when the user equipment belongs to the second set of user equipment, and
   wherein a preamble space is divided into four partitions, a first partition being used for a Release '99 access request, a second partition being used for a Release 8 Common E-DCH access request with the first TTI length and first E-AGCH code, a third partition being used for a Release 11 Common E-DCH access request with the first TTI length and first E-AGCH code, and a fourth partition being used for a Release 11 Common E-DCH access request with the second TTI length and the second E-AGCH code.

9. An apparatus comprising:
   at least one processor; and
   at least one memory including computer program code, the at least one memory and the computer program code configured, with the at least one processor, to cause the apparatus to perform:
   receive information on a requested transmission time interval length for use by a user equipment, wherein said information comprises one of a set of random access channel preambles, wherein said preambles are configured to be divided at least into a first set and a second set, wherein said first set of preambles is associated with said requested first transmission time interval length and said second set of preambles is associated with a second transmission time interval length, wherein said first set of preambles is associated with a first and a second set of user equipment and said second set of preambles is only associated with the second set of user equipment, and wherein the received information comprises an indication indicating which of a first set of resources is also available with said second transmission time interval length;
determine whether said requested first transmission time interval length can be used; and
cause, when said requested transmission time interval cannot be used, the second transmission time interval length to be used by said user equipment when the user equipment belongs to the second set of user equipment, and
wherein a preamble space is divided into four partitions, a first partition being used for a Release '99 access request, a second partition being used for a Release 8 Common E-DCH access request with the first TTI length and first E-AGCH code, a third partition being used for a Release 11 Common E-DCH access request with the first TTI length and first E-AGCH code, and a fourth partition being used for a Release 11 Common E-DCH access request with the second TTI length and the second E-AGCH code.

* * * * *